Figure 1:
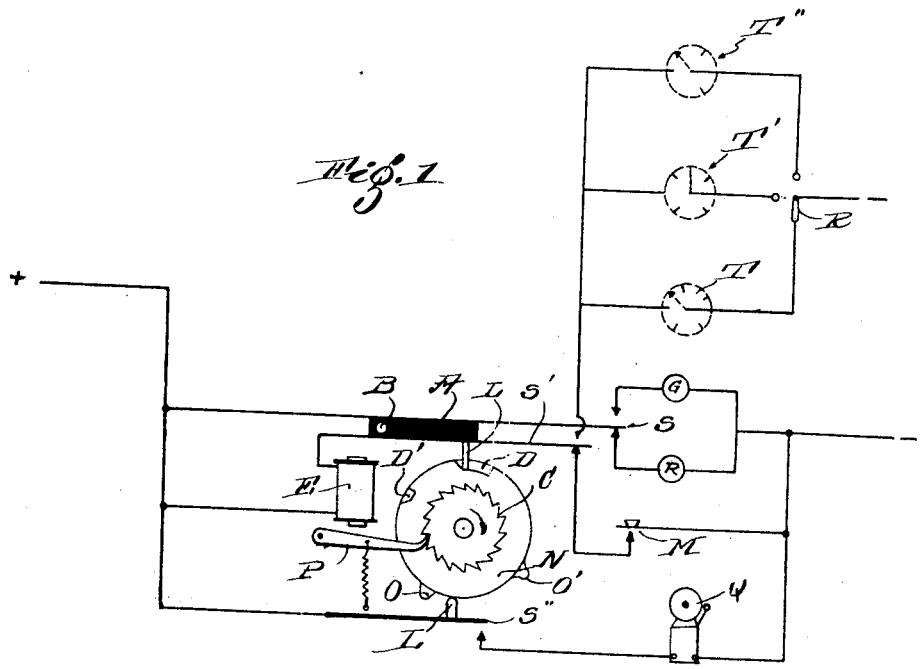

Dec. 15, 1931.  G. F. HARTER  1,836,797
ELECTRICAL CONTROL SYSTEM
Filed Feb. 18, 1929

Inventor
George F. Harter
By Roberts Cushman & Woodbury
his Attorneys

Patented Dec. 15, 1931

1,836,797

UNITED STATES PATENT OFFICE

GEORGE F. HARTER, OF SPRINGFIELD, MASSACHUSETTS, ASSIGNOR TO THE STANDARD ELECTRIC TIME COMPANY, OF SPRINGFIELD, MASSACHUSETTS, A CORPORATION OF CONNECTICUT

ELECTRICAL CONTROL SYSTEM

Application filed February 18, 1929. Serial No. 340,726.

The object of this invention is to provide an electrical control system which is simple and inexpensive to construct and install and which is reliable and durable in operation. While the system may be employed to control any desired number or kinds of circuits, a typical use consists in operating a plurality of lights or sound signals in predetermined time relationship.

The invention comprises a plurality of operating circuits together with motive means for collectively closing the circuits, a starter for starting the motive means, and mechanism for automatically stopping said means at the end of a predetermined period of time. The motive means preferably comprises a rotor turning in the same direction at each operation, in contradistinction to a rotor which is turned backwards to wind a spring and then permitted to return to its initial position. More specifically the invention comprises switching means actuated by a controller which is driven by a motor, preferably in the form of an electromagnetic step motor, with a branched control circuit for the motor, one branch containing a time switch and the other branch containing a manual switch, together with a two-way switch controlled by the controller, the two-way switch normally connecting the manual switch to the motor for starting the motor and then switching the motor to the time switch after the motor has started, the controller having means for restoring the two-way switch to normal position after a predetermined time, whereby momentary closing of the manual or starting switch causes the rotor to initiate a cycle of signals or other operations which cycle is terminated automatically by the controller at the end of the cycle.

The simple application of the invention shown diagrammatically for the purpose of illustration comprises a branched circuit containing signals G and R respectively (which may be green and red lights for example) either of which may be connected in circuit with a suitable source of power by means of the switch S, a branch circuit containing a gong Q and switch S'', an electromagnetic motor E, a branched circuit for the motor, one branch containing the normally-open manually-operated switch M and the other branch containing the time switch T which closes circuit at regular intervals, a two-way switch S' for connecting either branch of the aforesaid circuits to the motor E, a controller or timer in the form of a rotor N having a notch D in its periphery to receive a lug L on the switch assembly A and a lug O for closing switch S'', a ratchet wheel C interconnected with the rotor and a pawl P for actuating the ratchet wheel C in response to recurrent energizations of the magnet E. The lug L' is arranged to close S'' only while the timer is in one position whereas the notch for lug L is wide enough to permit switches S and S' to remain in the lower position not only while the timer is in said position but also while in the next succeeding position.

With the parts in the normal position as shown in Fig. 1, circuit through R is closed and the circuit through G is open, and the circuit through the magnet E is closed at S' but open at switch M. To initiate a cycle of signals switch M is closed momentarily to send an impulse of current through magnet E whereupon the rotor N is rotated in the direction of the arrow one step by the pawl and ratchet mechanism, this single step being sufficient to lift the lug L out of the recess in rotor N, thereby swinging the switch assembly A around the pivot B to a position wherein switch S opens circuit R and closes circuit G and switch S' opens circuit through M and closes circuit through T. The switch M may then be released to open circuit, the time clock T then functioning to send impulses to magnet E at the desired frequency. After the rotor N has made the major part of a revolution the lug L drops back into the recess in the periphery of the rotor, thereby restoring the switch assembly to the original position as shown in the drawings. The shift of the switch S' from the time switch circuit to the normally open circuit containing the manual switch M stops the motor; and the shift of switch S opens circuit G and closes circuit R. On the last step of the timer N under the control of time switch T the lug O closes switch S″ to ring gong Q simultaneously with the shift from G to R. Thus if the operator fails to note the change of lights his attention will be attracted by the aural signal. If it is desired to stop the gong without initiating a new cycle the circuit-closer M is depressed once, thereby advancing timer N one step to open switch S″. When the operator is ready to initiate a new cycle the circuit-closer M is again depressed to advance the timer another step, thereby lifting switches S and S″ to their upper positions and again placing the electromagnet E under the control of the time clock or automatic circuit-closer T.

It will of course be evident that the switch assembly A may comprise as many switches as necessary to control the number of circuits involved, and that instead of having a single recess in the rotor N a plurality of recesses may be provided to stop the rotor at more frequent intervals. It will also be noted that the operating circuits containing Q and R are closed simultaneously at the end of each automatic cycle and then opened successively by manual steps, the former on the first manual step and the latter on the second simultaneously with the closing of the operating circuit containing G.

In some cases it is desirable to vary the duration of the aforesaid cycle and for this purpose means may be provided to supply impulses of different frequency to the magnet E. Thus in Fig. 1 either of the periodic circuit-closers T′ and T″ may be substituted for circuit-closer T by means of switch R; and it will be understood that any number of such circuit-closers may be employed. As indicated by the different numbers of calibration marks on the respective circuit-closers T, T′ and T″, they transmit impulses at different rates respectively. Thus by substituting a circuit-closer having a slower or faster rate, the aforesaid cycle may be lengthened or shortened as desired.

Figure 2:
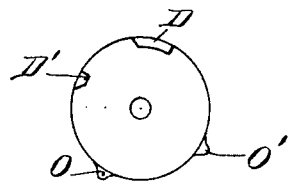

It will also be understood that instead of the rotor N having a single pair of switch actuators D—O it may have as many pairs as desired, a second pair being shown at D′—O′ in Fig. 2. By unevenly spacing the aforesaid pairs relatively to each other about the periphery of the rotor, succeeding automatic advances of the rotor may have different durations. For example the angular distance from D to D′ (and O to O′) may be such as to operate the signals at the end of four minutes whereas the angular distance from D′ to D (and O′ to O) may be such as to maintain the green light for a period of seven minutes. By substituting different rotors having different proportional distances between D and D′ (and O and O′) and/or different numbers of ratchet teeth C, the cycles may be varied indefinitely in both absolute and relative duration. While the notch D′ may have a circumferential extent equivalent to two steps of the rotor, as above described in connection with notch D, for many purposes it preferably has a dimension equivalent to only one step so that when the lug L moves into notch D′ and projection O′ actuates switch S″, a single depression of switch M will continue the automatic advance of the rotor to the end of the cycle.

As shown in the figures the notches D and D′ are formed in the front half of the rotor and the projections O and O′ on the rear half, the lugs L and L′ being correspondingly offset, so that the notches do not affect switch S′ and the projections do not engage lug L. It will also be understood that, in accordance with common practice, the ratchet and pawl may be arranged so that the pawl advances the ratchet when retracted by its spring rather than when advanced by the magnet.

I claim:

1. An electrical control system comprising a plurality of operating circuits, a switch for each circuit, a timer movable automatically in a timed cycle for actuating both switches, and manual means for advancing the timer a plurality of steps between cycles, one of said switches being actuated by one of said steps and the other switch by a succeeding step.

2. An electrical control system comprising a plurality of operating circuits, a switch for each circuit, a timer movable automatically in a timed cycle for actuating said switches at the beginning and end of a cycle respectively, and manual means for causing said timer to actuate one switch between successive cycles.

3. An electrical control system comprising a plurality of operating circuits, a switch fore each circuit, a timer movable automatically in a timed cycle for actuating said switches at the beginning and end of a cycle respectively, and manual means for causing said timer to actuate one switch without actuating the other switch between successive cycles.

4. An electrical control system comprising a plurality of operating circuits, separately operable devices controlled by said circuits respectively, a timer for controlling said circuits at predetermined intervals, means for automatically advancing the timer for a predeterminated period of time and then automatically stopping it at the end of the period, manual means for thence further advancing the timer a plurality of steps, the last step starting said automatic means.

5. An electrical control system comprising a plurality of operating circuits, separately operable devices controlled by said circuits respectively, a timer for controlling said circuits at predetermined intervals, means for automatically advancing the timer for a predetermined period of time and then auto matically stopping it at the end of the period, manual means for thence further advancing the timer a plurality of steps, one step actuating one device and a succeeding step actuating the other device.

6. An electrical control system comprising visual and audible signals, motive means moving in a timed cycle for operating both signals at the end of a cycle, a controller manually movable from normal to operative position and automatically returning to normal position when released, and means for discontinuing the audible signal in response to one movement of said controller and, in response to a succeeding movement of the controller, discontinuing the visual signal and initiating another cycle.

7. An electrical control system comprising a timer recurrently movable step by step, means for automatically stepping the timer forwardly through a cycle including a switch automatically opened by the timer at the end of the cycle and closed at the beginning of a new cycle, manual means for causing the timer to take a plurality of steps between cycles, a switch moved to different positions at the beginning and end of each cycle respectively, and another switch moved to different positions at the end of each cycle and intermediate succeeding cycles respectively.

8. An electrical control system comprising a timer recurrently movable step by step, means for automatically stepping the timer forwardly through a cycle, manual means for causing the timer to take a plurality of steps between cycles, two switches moved to different positions at the beginning and end of each cycle respectively, and another switch closed at the end of each cycle and opened on the first of said plurality of steps.

9. An electrical control system comprising a cyclic timer, means including an electromagnet for stepping the timer through a cycle, manual and automatic circuit-closers for energizing said magnet, a switch controlled by the timer for transferring the electromagnet from the automatic to the manual circuit-closer at the end of a cycle and thence back to the automatic circuit-closer at the beginning of a new cycle and another switch actuated under control of the timer at the end of said cycle and again intermediate successive cycles.

10. An electrical control system comprising a cyclic timer, means including an electromagnet for stepping the timer through a cycle, manual and automatic circuit-closers for energizing said magnet, a switch controlled by the timer for transferring the electromagnet from the automatic to the manual circuit-closer at the end of a cycle and thence back to the automatic circuit-closer at the beginning of a new cycle, a second switch movable back and forth concomitantly with said switch, and a third switch controlled by the timer to close circuit at the end of said cycle and to open circuit before the beginning of a new cycle.

11. An electrical control system comprising a plurality of operating circuits, motive means for closing said circuits simultaneously and opening them successively, said means including a rotor turning in the same direction at each operation, a starter for manually starting said means, mechanism for automatically stopping said means at the end of a predetermined period of time, said mechanism being controlled by said rotor.

12. An electrical control system comprising a plurality of operating circuits, switches for controlling said circuits, a rotor for closing said switches simultaneously and opening them in sequence, the rotor turning only in one direction, an electromagnet for driving said rotor in said direction, a circuit for said electromagnet including a switch controlled by the rotor and a manual switch.

13. An electrical control system comprising a plurality of operating circuits, switches for controlling said circuits, a rotor for closing said switches simultaneously and opening them in sequence, the rotor turning only in one direction, an electromagnet for driving said rotor in said direction, a circuit for said electromagnet including a starting switch and a stopping switch, and means for automatically opening the stopping switch after the rotor has rotated a predetermined degree.

14. An electrical control system comprising a plurality of operating circuits, switches for controlling said circuits, a rotor closing said switches simultaneously and opening them in sequence, the rotor turning only in one direction, an electromagnet for driving said rotor in said direction, a branched control circuit for said electromagnet, one branch containing a time switch and the other branch containing a manual switch, and a two-way switch controlled by said rotor for connecting either branch to the electromagnet.

15. An electrical control system comprising a plurality of operating circuits, switches for controlling said circuits, a controller for closing said switches simultaneously and opening them in sequence, a motor for driving said controller, a branched control circuit for said motor, one branch containing a time switch and the other branch containing a manual switch, and a two-way switch controlled by said controller normally connecting said manual switch to the motor for starting the motor and then switching the motor to the time switch after the motor has started, the controller having means for restoring the two-way switch to normal position after a predetermined time.

16. An electrical control system comprising a plurality of signal circuits, switches for controlling said circuits, a rotor for closing said switches simultaneously and opening them successively, an electromagnet for stepping the rotor around, a branched circuit for said electromagnet, one branch containing a manual starting switch and the other branch containing a time switch for transmitting impulses to said electromagnet at a predetermined rate, a two-way switch for connecting either of said branches to the electromagnet, and means associated with the rotor for moving said two-way switch to the time-switch branch when the rotor is started and then back to the starting-switch branch after the rotor has rotated a predetermined degree, whereby momentary closing of the starting switch causes the rotor to initiate a cycle of signals which cycle is terminated automatically.

Signed by me at Springfield, Massachusetts, this 9th day of February, 1929.

GEORGE F. HARTER.